United States Patent [19]

Hara et al.

[11] Patent Number: 4,524,507
[45] Date of Patent: Jun. 25, 1985

[54] LAMINATED CORE PRODUCING APPARATUS

[75] Inventors: Yoshihumi Hara, Hirakata; Hiroji Takano, Yawata; Shoshi Kabashima, Hirakata; Mikio Hasegawa, Kadoma, all of Japan

[73] Assignee: Matsushita Electric Industrial Co., Ltd., Kadoma, Japan

[21] Appl. No.: 451,209
[22] PCT Filed: Mar. 31, 1981
[86] PCT No.: PCT/JP81/00072
 § 371 Date: Nov. 30, 1982
 § 102(e) Date: Nov. 30, 1982
[87] PCT Pub. No.: WO82/03491
 PCT Pub. Date: Oct. 14, 1982

[51] Int. Cl.³ .................................. B23Q 15/00
[52] U.S. Cl. .................. 29/564.2; 29/33 Q; 29/736; 29/738
[58] Field of Search ............ 29/564.1, 564.2, 566.3, 29/736, 738, 732, 609, 596, 33.5, 33 Q

[56] References Cited

U.S. PATENT DOCUMENTS

| 3,203,077 | 8/1965 | Zimmerle | 29/609 |
| 4,073,373 | 2/1978 | Crowley et al. | 29/738 X |
| 4,110,895 | 9/1978 | Mitsui | 29/736 X |
| 4,294,006 | 10/1981 | Fair et al. | 29/596 |

FOREIGN PATENT DOCUMENTS

| 150613 | 6/1975 | Japan | 29/738 |
| 156305 | 12/1977 | Japan | 29/738 |
| 149820 | 11/1979 | Japan | 29/738 |

Primary Examiner—William R. Briggs
Attorney, Agent, or Firm—Wenderoth, Lind & Ponack

[57] ABSTRACT

A laminated core product producing apparatus wherein a projection is formed on part of a strip of core sheet material and core sheets are punched out of the strip and assembled in a linearly moving stack into the laminated core product by making use of the mutual fitting and crimping of the projections on the core sheets. The dimension of the laminated core product in the direction of the thickness of the core sheets is determined by controlling the intermittent punching out of the projections. A marking mechanism selectively marks a portion of the lateral side edge of a core sheet to be punched out, and at least one proximity sensor provided adjacent the stacked core sheets being assembled into the core product produces a signal corresponding to the distance of a marked core sheet from the head of the stack during movement of the marked core sheet along the stack. A timing signal generated each time a core sheet is punched out and assembled on the stack, a preset target value of the dimension of the core product, and information about the distance of the proximity sensor from the head of the stack, are also supplied to a control device, which calculates the dimension of the assembly of the core sheets and divides by the number of sheets counted to find the average thickness of one core sheet and adds the value of such average thickness for the number of core sheets to provide a cumulative value for each timing signal and controls the operation of a punching mechanism when the cumulative value exceeds the target value to avoid punching out a projection.

4 Claims, 18 Drawing Figures

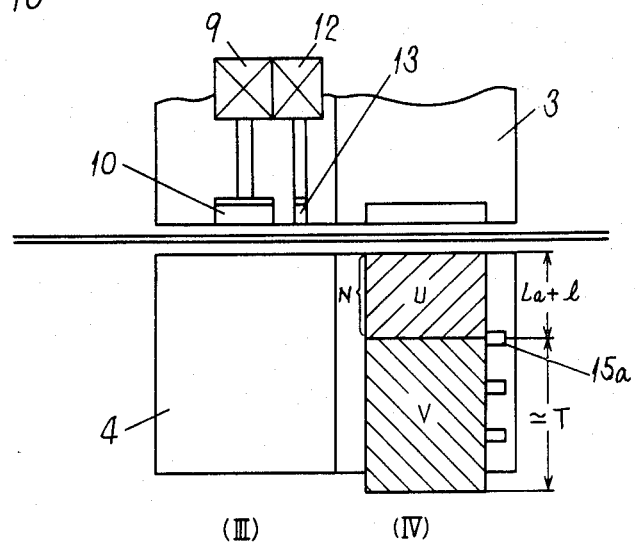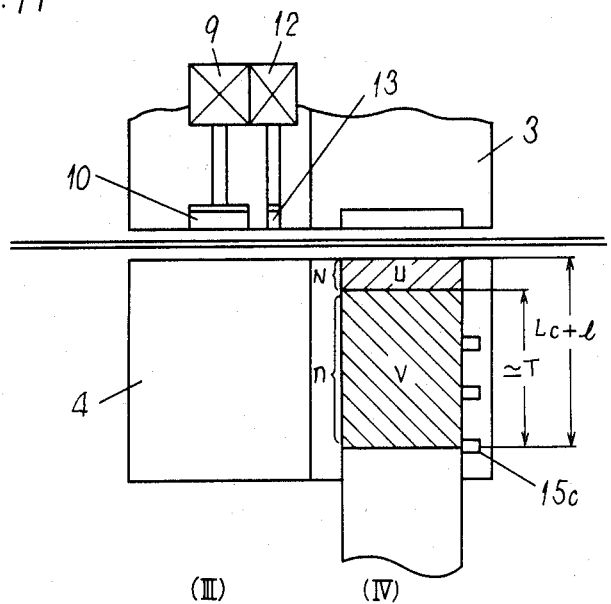

LAMINATED CORE PRODUCING APPARATUS

TECHNICAL FIELD

The present invention relates to an apparatus for producing laminated cores forming stators for electric machines, and provides a laminated core producing apparatus capable of punching out core sheets from a long strip of core sheet material by metal dies and concurrently fitting and crimping together already punched-out core sheets in the same metal dies to thereby provide a laminated core of predetermined thickness.

BACKGROUND ART

FIG. 1 is a schematic view, in longitudinal section, of a conventional laminated core producing apparatus, and FIG. 2 is a plan view showing how a core sheet is formed. A strip 1 of a material for a laminated core product is guided to upper and lower metal dies 3 and 4 through guide rollers 2. When the upper metal die 3 lowers, the core sheet 1 is punched at first and second stations, as shown in FIG. 2; at a third station it is formed with crimp projections 11 or holes and at a fourth station contour punching-out and crimping are performed. Each time the upper metal die 3 moves up and down, the strip 1 is fed a predetermined pitch by the guide rollers 2, and with this operation repeated, punched out core sheets are laminated in the fourth station of a lower metal die 4. On the other hand, at a timing obtained by a microswitch 6 for detecting the up and down movement of the upper die 3, the thickness of the strip 1 is measured by a sheet thickness sensor 7 before it enters the metal dies, the data being successively shifted until the thickness-measured portion of the core sheet reaches the third station of metal die and being then stored in a control device 8. The control device 8 successively adds the sheet thickness at the third station of metal die, to find the sum. A punch 10 at the third station is movable by a solenoid 9, as shown in FIGS. 3 and 4. The control device 8 controls the solenoid 9 in such a manner that when said sum of sheet thicknesses is below a preset target value for the laminated core, the punch 10 is caused to project to form a crimping projection 11 on the strip 1, as shown in FIG. 3, but when said sum reaches the target value, it is caused to project to form a throughgoing hole, as shown in FIG. 4, whereupon said sum is set to zero. Then, the punched out core sheets 5 in the metal die at the fourth station are in an unbound state for the preset target value and become a laminated core product of predetermined thickness.

The usual laminated core product is formed by laminating 40–100 core sheets, and the preset value for lamination thickness is 20–50 mm in the case of a core sheet having a thickness of 0.5 mm. The dimensional accuracy of the product depends on lamination thickness, but increasingly high accuracy is being demanded year by year. For example, for a specification lamination thickness of 50 mm, it is 50±0.5 mm or thereabouts, and if the nominal value of sheet thickness is 0.5 mm, 100 sheets will be assembled. In this case, the point of time when the control device 8 controls the solenoid 9 (referred to as the throughgoing hole making solenoid) to form a throughgoing hole is when the aforesaid sum is not less than the target value T, which is defined by the following formula.

$$T = \text{(lamination thickness preset value)} - \frac{\text{(sheet thickness)}}{2} \quad (1)$$

Substituting the lamination thickness preset value of 50 mm and the sheet thickness of 0.5 mm gives T=49.750 mm, and the total lamination thickness H of the laminated core product obtained is 49.75 mm≦H<50.25 mm.

However, since the allowable lamination thickness of the core product is 50 mm±0.5 mm, as described above, the allowable lamination thickness measurement error is ±0.25 mm. Therefore, the sheet thickness measurement error for a single core sheet is obtained by dividing said value by 100, or ±0.0025 mm. That is, there is a need for a sheet thickness sensor 7 capable of measuring 0.5-mm thick core sheets with an absolute accuracy of ±2.5 μm. A similar calculation shows that when the core product thickness specification is 100±0.5 mm and the standard sheet thickness is 0.5 mm, the accuracy per sheet is ±0.00125 mm. Further, this sheet thickness sensor should have a quick response, capable of measurement while the core sheet 1 is being intermittently fed at high speed. However, there is no commercially available sensor which satisfies said accuracy, other than the contact type sheet thickness sensor adapted to be brought into direct contact with the core sheet. If the contact type sheet thickness sensor is used, however, because of contact between the sensor and the core sheet, prolonged use will result in the sensor being gradually worn, no longer assuring the accuracy. For this reason, periodical inspection is required at short intervals. Further, there are many instances where the specification cannot be satisfied in the matter of said response speed.

Thus, there has been a drawback with the conventional system that, at present, since the accuracy of the sensor is insufficient it has been impossible to perform lamination thickness control with high accuracy.

DISCLOSURE OF THE INVENTION

The present invention provides a laminated core producing apparatus, wherein a crimping projection is formed on part of a core sheet and such core sheets are assembled by making use of the mutual fitting and crimping action of the projections, the thickness of the laminated core product being determined by controlling the intermittent punching for said projection, said apparatus comprising a marking mechanism for selectively marking the lateral side of a portion of the strip to be punched out, a proximity sensor provided in a metal die for producing a signal corresponding to the proximity distance of the marked core sheet in the process of production, means for generating a timing signal each time said production apparatus places one core sheet, means for presetting a target value for the lamination thickness of a core product, memory means for storing information about the position of said proximity sensor, an intermittent punching mechanism capable of electrically controlling the decision of whether or not to form said projection, and a control device whereby, when the count of said timing signals after actuation of said marking mechanism is the number of punched out sheets in the laminated core product, the lamination thickness calculated from the information provided by the proximity sensor detecting said marked core sheets and from the information about the position of said proximity sensor is divided by said number of sheets in the laminated core product to find the average thickness of one core sheet and the values of such average thickness are added up to provide a cumulative value for each said timing signal so as to control the operation of said punching mechanism when said cumulative value exceeds said target value. According to the invention, highly accurate control of laminated core product thickness is possible even with an inexpensive sensor having an accuracy of only about 0.1 mm. Further, even in the case of a sudden change in the core sheet thickness, the same high accuracy can also be maintained. Moreover, maintenance for retention of accuracy is very easy.

BRIEF DESCRIPTION OF THE DRAWINGS

FIGS. 10 and 11 are further views similar to FIG. 9 for further illustration of the principle;

FIG. 14 is a vertical section of the metal die, taken along the line Y—Y' of FIG. 13;

BEST MODE FOR CARRYING OUT THE INVENTION

Figure 1:
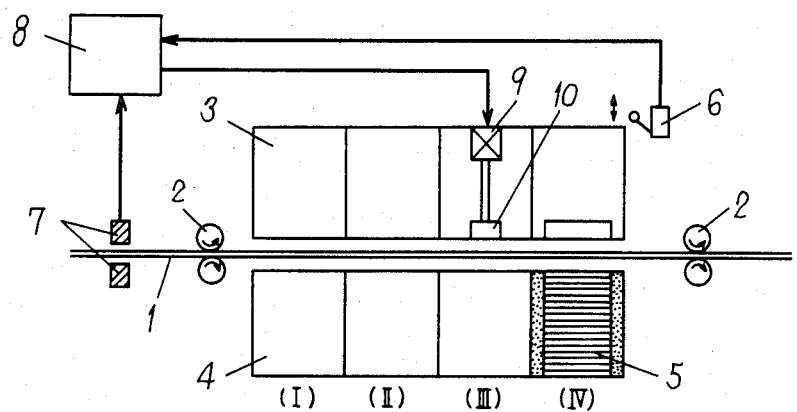
FIG. 1 is a schematic vertical section of a conventional laminated core producing apparatus.
Figure 2:
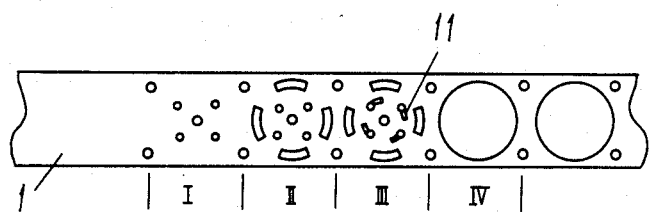
FIG. 2 is a plan view showing how a core sheet is formed.
Figure 3:
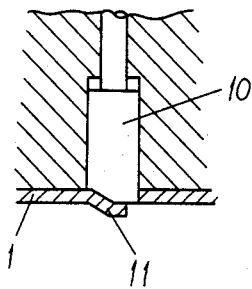
FIG. 3 is a view showing the formation of a crimping projection on the core sheet.
Figure 4:
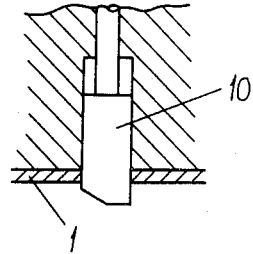
FIG. 4 is a view showing the formation of a through-going hole.
Figure 5:
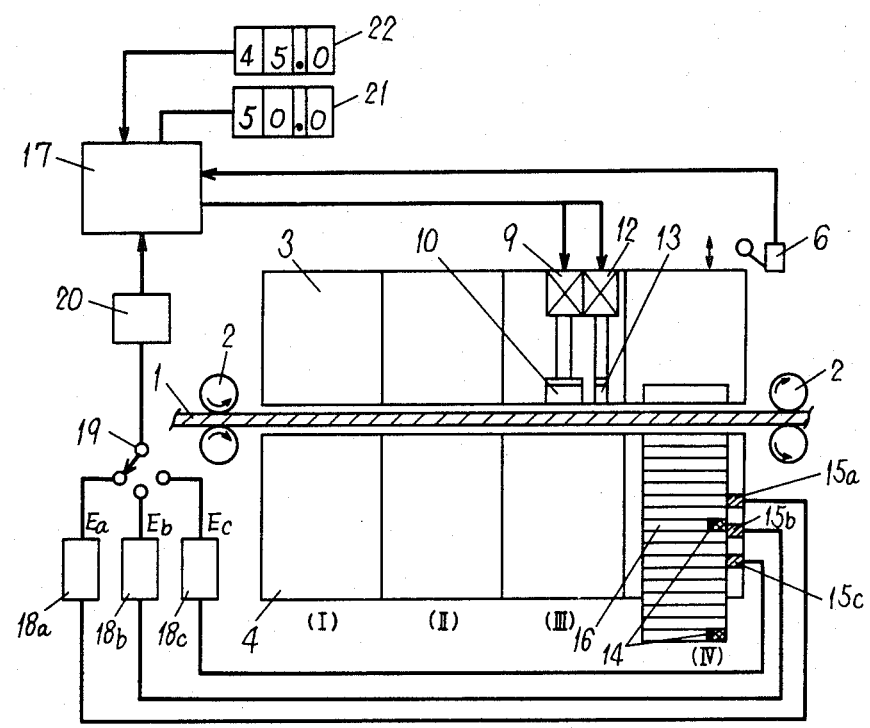
FIG. 5 is a schematic vertical section of a laminated core producing apparatus according to an embodiment of the present invention.
Figure 6:
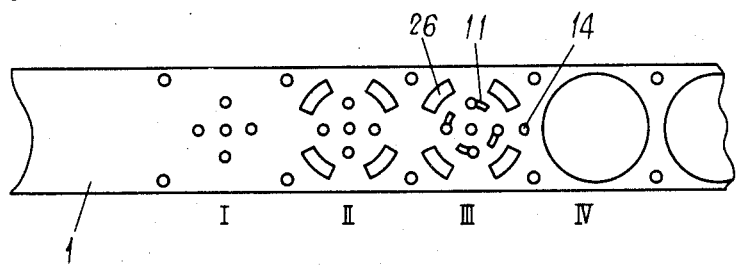
FIG. 6 is a plan view showing how a core sheet is formed in said embodiment.

The present invention will now be described with reference to FIGS. 5 and 6 showing a first embodiment thereof. In the figures, the parts numbered 1-6 and 9-11 are the same as those shown in FIG. 1 showing a conventional example. The number 13 denotes a punch for punching mark holes, connected to a marking solenoid 12, so that when the latter is actuated, it forms a mark hole 14 in a strip 1 of core sheet material, as shown in FIG. 6, the solenoids 9 and 12 being actuated at the same time. The position of hole 14 is such that when a core sheet 16 is punched out of strip 1, part of the hole 14 is in the edge of core sheet 16.

The characters 15a, 15b and 15c denote mark hole proximity sensors attached to the interior of the fourth station of the lower metal die 4 and serving to detect the position of a punched out core sheet 16 having a mark hole 14. The output signals from the proximity sensors 15a, 15b and 15c are transferred to amplifiers 18a, 18b and 18c, which compensate for variations in the sensitivity and zero point of the proximity sensor unit. The analog outputs from the amplifiers 18a, 18b and 18c are converted into digital signals by A-D converter 20 through a changeover switch 19 and transferred to a control device 17. The control device 17 has a microcomputer incorporated therein and is capable of doing addition, subtraction, multiplication and division and of controlling the solenoids 9 and 12. The numeral 21 denotes a digital switch for presetting the laminated core product thickness value, and 22 denotes a presetting digital switch for the sensor position to be later described.

The operation of the proximity sensors 15a, 15b and 15c will now be described with reference to FIGS. 7 and 8. FIG. 8 is an enlarged view of a portion adjacent the proximity sensor 15b and mark hole 14 in FIG. 6. As core sheets are successively punched out of strip 1 by the up and down movement of the upper metal die 3, the core sheet 16 is moved in the direction of arrow X.

As the core sheet 16 approaches the proximity sensor 15b, amplifier output $E_b$ gradually increases until it reaches a maximum $E_{max}$ when the proximity sensor is aligned with the centerline of the core sheet 16, but it begins to decrease again as the core sheet moves away from the proximity sensor. Therefore, the relation between the centerline distance l between the core sheet 16 having a mark hole and the proximity sensor 15b, and the sensor output $E_b$ is as shown in FIG. 7. When the core sheet 16 having a mark hole approaches the proximity sensor 15b as it moves in the metal die in the direction shown in FIG. 8 until amplifier output $E_b$ assumes a value between A and B in FIG. 7, the approximate relation $$l \simeq C_1 E_b + C_2 \quad (2)$$

($C_1$ and $C_2$ are constants) holds between $E_b$ and proximity distance l (negative value), as is clear from the figure.

By registering this formula in the control device 17 in advance, it is possible for the control device 17 to calculate the value of proximity distance l from the value of $E_b$.

Figure 7:
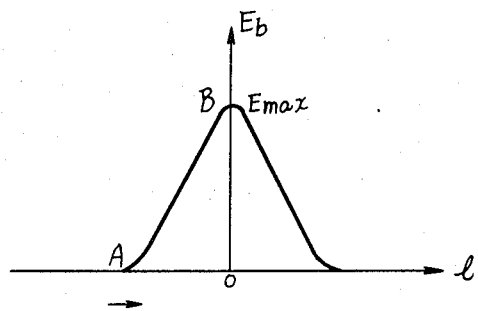
FIG. 7 is a characteristic diagram of a proximity sensor.
Figure 8:
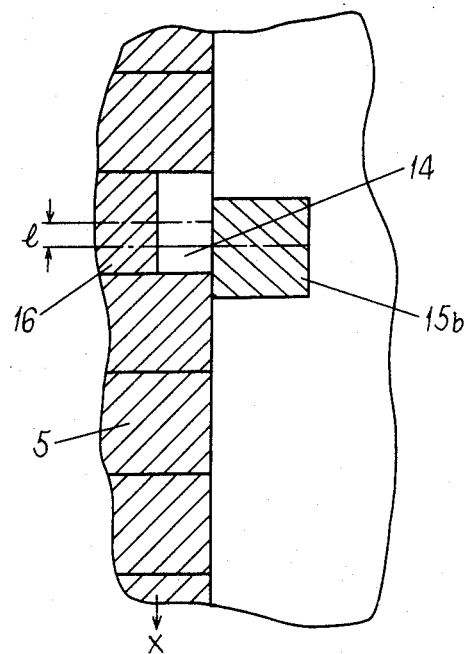
FIG. 8 is a view showing the positional relation between a proximity sensor in a metal die and a core sheet having a mark hole.

Similarly, when the core sheet 16 having a mark hole approaches the proximity sensors 15a and 15c, sensitivity and zero point are amplified by the amplifiers 18a and 18c, so that the relations of FIG. 7 and formula (2) also hold.

Figure 9:
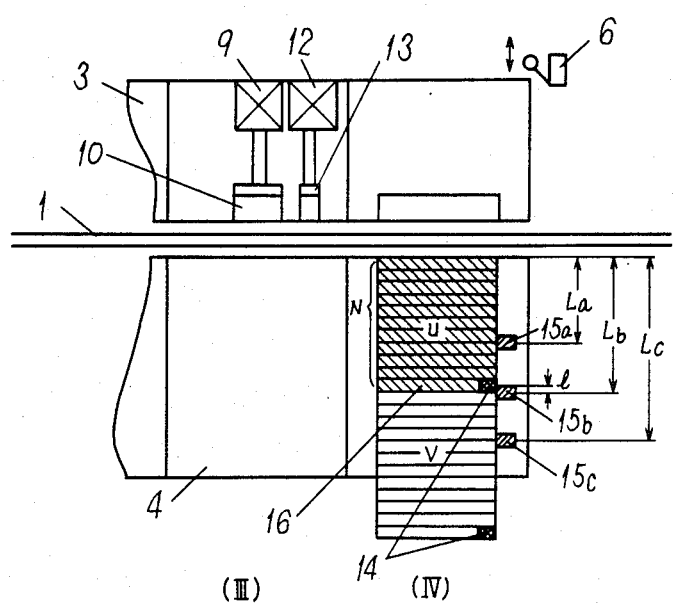
FIG. 9 is a detailed view illustrating the principle of the embodiment.

Now, a description will be given of the method of finding the accurate lamination thickness of the core product from the proximity distance l of the core sheet 16 calculated from formula (2) using outputs $E_a$, $E_b$ and $E_c$ obtained by detecting the core sheet 16 having a mark hole 14 by the proximity sensors 15a, 15b and 15c. FIG. 9 shows the portion of FIG. 5 related to the principle of the present invention, illustrating the point in time when the core sheet 16 having a mark hole is pushed down by core sheets successively punched out in each up and down movement of the metal die and is detected by the proximity sensor 15b. In the figure, let $L_b$ (mm) be the distance from the inlet for lamination core sheets punched out by the lower metal die at the fourth station to the centerline of the proximity sensor 15b, l (mm)

(negative value) be the distance between the centerlines of the proximity sensor 15b and core sheet 16, and N be the number of core sheets U stacked upwardly of the core sheet 16 having a mark hole, including the core sheet 16. When the average sheet thickness $t_b$ of these N core sheets is considered, since the core sheet 16, having its centerline detected, can be calculated at 0.5 as its valve, $t_b$ can be found from the following formula.

$$t_b = \frac{L_b + l}{N - 0.5} \quad (3)$$

Now, an allowance of 10% is given by JIS (Japanese Industrial Standards) to electromagnetic steel sheets used for the cores of electric machines. Thus, if the standard sheet thickness is, e.g., 0.5 mm, the average sheet thickness of the sheet varies between 0.45 mm and 0.55 mm. However, when a strip of core sheet material is considered by dividing it into constant lengths, a comparison of the average thicknesses of two successive portions of the core sheet shows that the average thicknesses are nearly equal, because the conditions of the process of production of the strip of core sheet material to be used cannot change suddenly. That is, the average sheet thickness of the core sheets in group U above the core sheet 16 having a mark hole in FIG. 9 may be considered to be nearly equal to the average thickness of the core sheets in group V below said core sheet 16, as can be proved by actual measurement. Further, the average sheet thickness of a certain number of core sheets subsequently formed and successively stacked on the core sheets in group U is nearly equal to the average sheet thickness of the core sheets in group U.

Since the core sheet 16 has a throughgoing hole formed therein, the thickness of the semi-finished product in the present state is equal to the thickness $L_b$ of the total number of core sheets in group U.

However, since the throughgoing hole forming process using the solenoid 9 is (at the third station) one step prior to the laminating process, the thickness of the semi-finished product U consists substantially of N+1 sheets, so that the thickness $S_b$ of the semi-finished product U is given by $$S_b = (N + 1)t_b = |(N - 0.5) + 1.5|t_b \quad (4)$$
$$= (L_b + l) + 1.5\, t_b$$

Each time the upper metal die 3 moves up and down, said average sheet thickness $t_b$ is added to the thickness $S_b$ of the semi-finished product U, providing the total thickness of the semi-finished product at this point of time. When this value exceeds the target value T, the throughgoing hole making solenoid 9 and the mark hole making solenoid 12 are controlled to form a throughgoing hole in the strip 1. In so doing, a product which comes in the predetermined lamination thickness range will be obtained.

This type of core producing apparatus often produces many types of products of the time shape but of different total thicknesses by changing the product thickness preset value while using the same metal die. In the present invention, to facilitate such alterations, it is so arranged that said product thickness preset value is entered in the digital switch 21 of FIG. 5 and inputted into the control device 17.

In the foregoing description, it has been stated that said average sheet thickness $t_b$ and the average sheet thickness of the stip of core sheet material within the subsequent predetermined length have an error of $\pm 2$ $\mu$m or less for each sheet. Actual production proves that this assumption is correct in many cases. However, when the nominal sheet thickness is 0.5 mm and the product thickness preset value is 50 mm, there occurs a rare instance in which the difference in thickness between one product and the next product is as high as about 0.6 mm (about 6 $\mu$m per sheet). Since the occurrence of such sudden change in the core sheet thickness causes the calculated value of the product thickness to differ to a large extent from the actually measured value, defective laminated articles which fail to come within the predetermined lamination thickness range will be produced. To prevent production of defective laminated articles even in the case of such a sudden change in the sheet thickness, the present invention solves this problem by installing a plurality of proximity sensors, as shown in FIGS. 5 and 9, to utilize a single sensor which is most effective for the product thickness preset value. Supposing that the product thickness target value is 50 mm, nominal sheet thickness is 0.5 mm and the distances $L_a$, $L_b$ and $L_c$ of the proximity sensors 15a, 15b and 15c from the upper surface of the metal die are 35 mm, 45 mm and 55 mm, respectively, the sensor which is best to use will be described. In FIG. 9, since the proximity sensor 15b is used, the thickness of the semi-finished product U can be calculated from formula (4). Since the inside of the parentheses on the right-hand side of formula (4) indicates the distance from the upper surface of the metal die to the centerline of the core sheet 16 having a mark hole, if the detection accuracy of the proximity sensor 15b is supposed to be $\pm 0.1$ mm, then the error is only $\pm 0.1$ mm with respect to $L_a + l$ ($\approx 45$ mm).

If the lamination thickness target value is 50 mm, the remaining portion, about 5 mm (=50 mm−45 mm), to be assembled after the condition shown in FIG. 9 until a product is obtained, becomes the portion whose number is to be controlled, supposing that it is equal to the average sheet thickness $t_b$ for one sheet. Since the number of sheets in the remaining portion is about 10 (=5 mm ÷0.5 mm), even assuming that there is an error of as large as 6 $\mu$m between the average sheet thickness $t_b$ and the average value of actually measured sheet thickness, the error between the calculated value for the remaining portion and the measured thickness is 0.06 mm (6 $\mu$m × 10 sheets) at a maximum. Thus, the total error between the measured and calculated values for the predetermined product thickness, including the proximity sensor error of $\pm 0.1$ mm, is 0.16 mm (=0.1 mm+0.06 mm) at a maximum.

FIG. 10 shows the use of the proximity sensor 15a and in this case the total error between the measured and calculated values is calculated in the same manner as in FIG. 9. As in formula (4), the thickness Sa of the semi-finished product U is given by $$Sa = (L_a + l) + 1.5\, t_a \quad (5)$$

In addition, $t_a$ is the average sheet thickness, which can be calculated in the same manner as in formula (3).

Similarly, the portion $(L_a + l) \approx 35$ mm in the parentheses of formula (5) is measured with an accuracy of $\pm 0.1$ mm, and since the remaining portion 15 mm with respect to the product thickness target value is a portion supposed to be equal to the average sheet thickness $t_a$, the error between the calculated value for about 30 sheets in this portion and the measured product thickness is 0.18 mm (=30 sheets×6 μm) at a maximum. Thus, the total error is 0.28 mm (=0.1 mm+0.18 mm), an increase of 0.12 mm over FIG. 9, going outside the specification error range of ±0.25 mm, so that there is a possibility of producing defective laminated articles.

FIG. 11 shows the use of the proximity sensor 15c. The average sheet thickness $T_c$ can be calculated by the following formula.

$$t_c = \frac{L_c + l}{N + n - 0.5} \quad (6)$$

It is clear from the figure that no mark hole detection is made for the semi-finished product U, so that the product thickness calculating formula differs from those for FIGS. 9 and 10, the product thickness of the semi-finished product U and the subsequent product thickness being calculated by average lamination thickness calculation value $t_c$×(number of sheets). Thus, the total error is calculated as follows: Since the product thickness preset value is 50 mm and about 100 sheet are assembled, the total error is 0.6 mm (=100 sheets×6 μm)+0.1 mm (detection error of sensor).

Thus, the product thickness accuracy is very poor as compared with FIG. 10, often resulting in the production of defective laminated articles, should the sheet thickness change suddenly. If, however, the product thickness preset value is 60 mm, the use of the proximity sensor 15c provides exactly the same conditions as in FIG. 9, so that the total error is 0.16 mm and no defective articles will be produced.

As described above, it is necessary to selectively use the three proximity sensors according to a product thickness preset value by picking out the proximity sensor which is at the mounting position liable to cause least error.

Where $L_a$=35 mm, $L_b$=45 mm, and $L_c$=55 mm, as described above, said total error can be minimized by using the proximity sensor 15a if the product thickness preset value is 47 mm or less, the proximity sensor 15b if it is 47-57 mm, and the proximity sensor 15c if it is above 57 mm. If the proximity sensors are selectively used in this manner, the total error will be ±0.25 mm or less in the case of the product thickness range of 37 mm–67 mm. If there is a need for lamination thickness control which satisfies the predetermined accuracy for product thickness preset values outside said range, one or more proximity sensors may be added.

In FIG. 5, a sensor position setting digital switch 22 is provided for the selected proximity switch for the reason described above. Thus, the operator measures and sets the distance from the upper end surface of the metal die to the proximity sensor selected in consideration of said conditions and manipulates the changeover switch 19 so that the output from the amplifier for the selected proximity sensor can be inputted into the control device 17.

Figure 12:
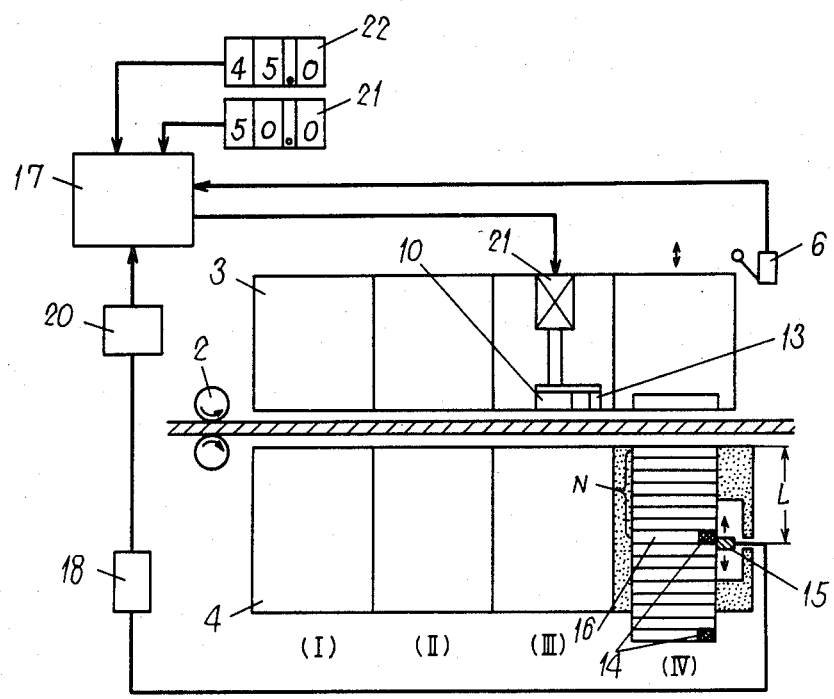
FIG. 12 is a schematic longitudinal section of a laminated core producing apparatus according to another embodiment of the invention.

The description given so far refers to the use of a plurality of proximity sensors. In FIG. 12, the construction is such that the position at which the proximity sensor 15 is attached to the lower metal die 3 can be vertically changed, and product thickness control is possible on the same principle as that described above. That is, this may be considered by substituting L for $L_b$ in formulas (3) and (4). In this case, the aforesaid changeover switch 19 becomes unnecessary, and since there is only one amplifier 18, which is associated with the proximity sensor 15, there is no need to compensate for differences in the characteristics of sensors in connection with amplifiers as in the above.

In this manner it is possible to effect product thickness control with very high accuracy by accurately detecting the core sheet 16 having a mark hole and accurately calculating the average sheet thickness of the core sheet. To this end, it is necessary for the control device 17 to know the numerical values of $L_b$, l and N in formula (3) in the state of FIG. 9.

The operator may find the value of $L_b$ by measuring the distance from the upper end surface of the lower metal die to the center of the proximity sensor 15b and set said value in the digital switch 22 to use it as input data to the control device 17. From the relation of FIG. 7 described above it is possible to find the value of l by inputting the sensor output $E_b$ into the control device 17 through the A-D converter 20. On the other hand, the value of N, which is the number of core sheets punched out after the actuation of the mark hole making solenoid 12, is made known to the control device 17 by counting the number of signals from the microswitch 6. Thus, the average sheet thickness can be calculated by substituting these numerical values in formula (3). If the control device 17 is constructed with a microcomputer incorporated therein, it is possible to store and calculate said data by a simple arrangement. Since the mark hole in the strip to be punched out as a core sheet is formed at the same time as the formation of a throughgoing hole, the proximity sensor detects the mark hole once for one product and the average sheet thickness is calculated at this time. Since said timing for operating the throughgoing hole and mark hole making solenoids 9 and 12 cannot be obtained at the time of initially operating the production apparatus, a control circuit is incorporated in the control device 17 which unconditionally actuates the throughgoing hole and mark hole making solenoids 9 and 12 so as to produce a core sheet having a mark hole.

Whereas the conventional apparatus requires that the error in measurement of sheet thickness be ±0.0025 mm or less according to aforesaid calculation in order to obtain a product lamination thickness of 50±0.5 mm, in the present invention it suffices that the error in measurement of $L_b$+l in formula (3) is ±0.1 mm. Therefore, it is easy to attain the predetermined accuracy by using a magnetic proximity sensor of special construction, a reflection type photoelectric sensor, or an air pressure sensor constructed by using an air back pressure sensor 23 with the lower metal die 4 formed with an air nozzle, shown as an the embodiment in FIGS. 13 and 14.

Figure 17A:
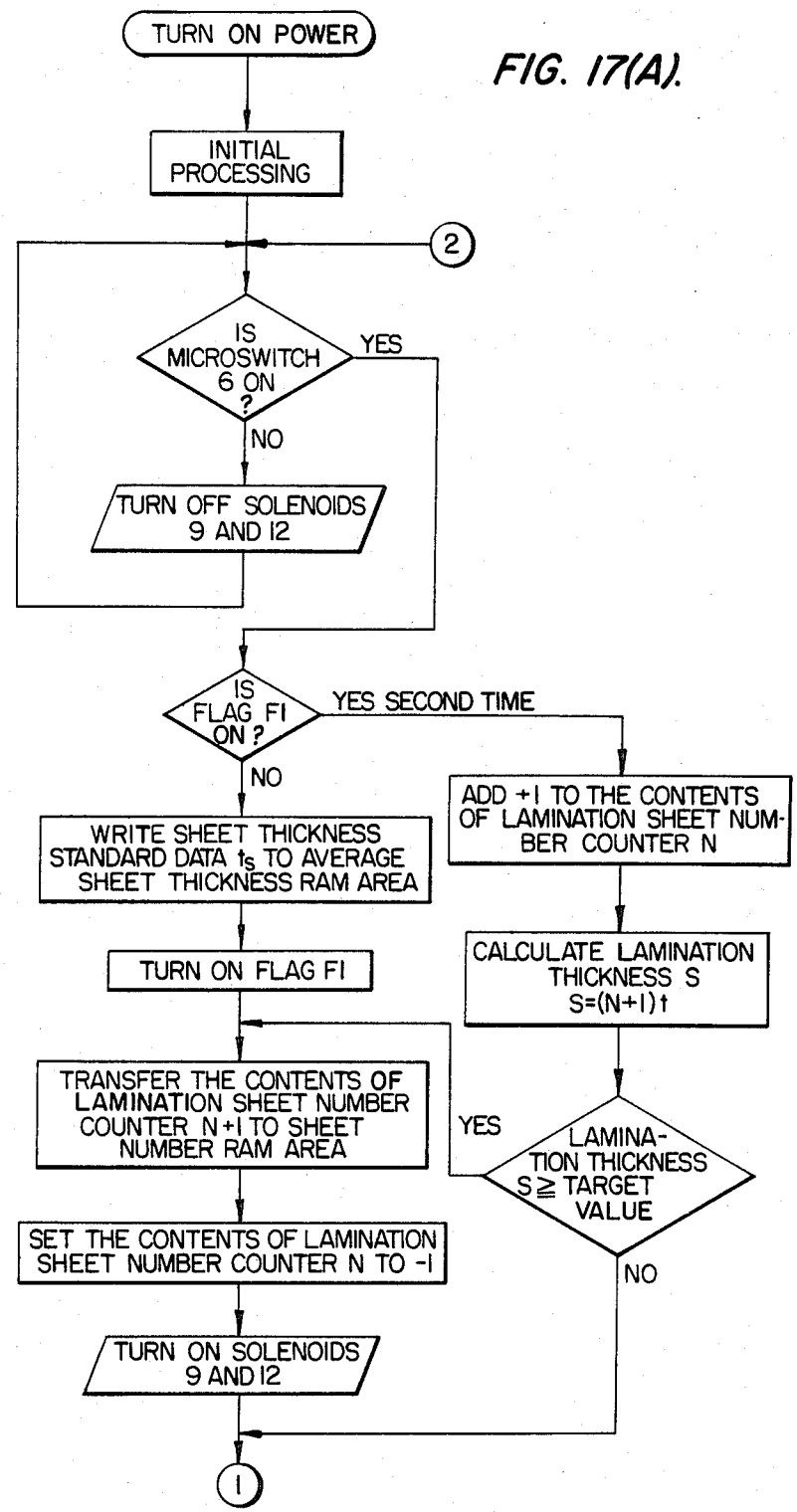
FIGS. 17 (A) and (B) are flowcharts of control action in a control device of the embodiment.
Figure 17B:
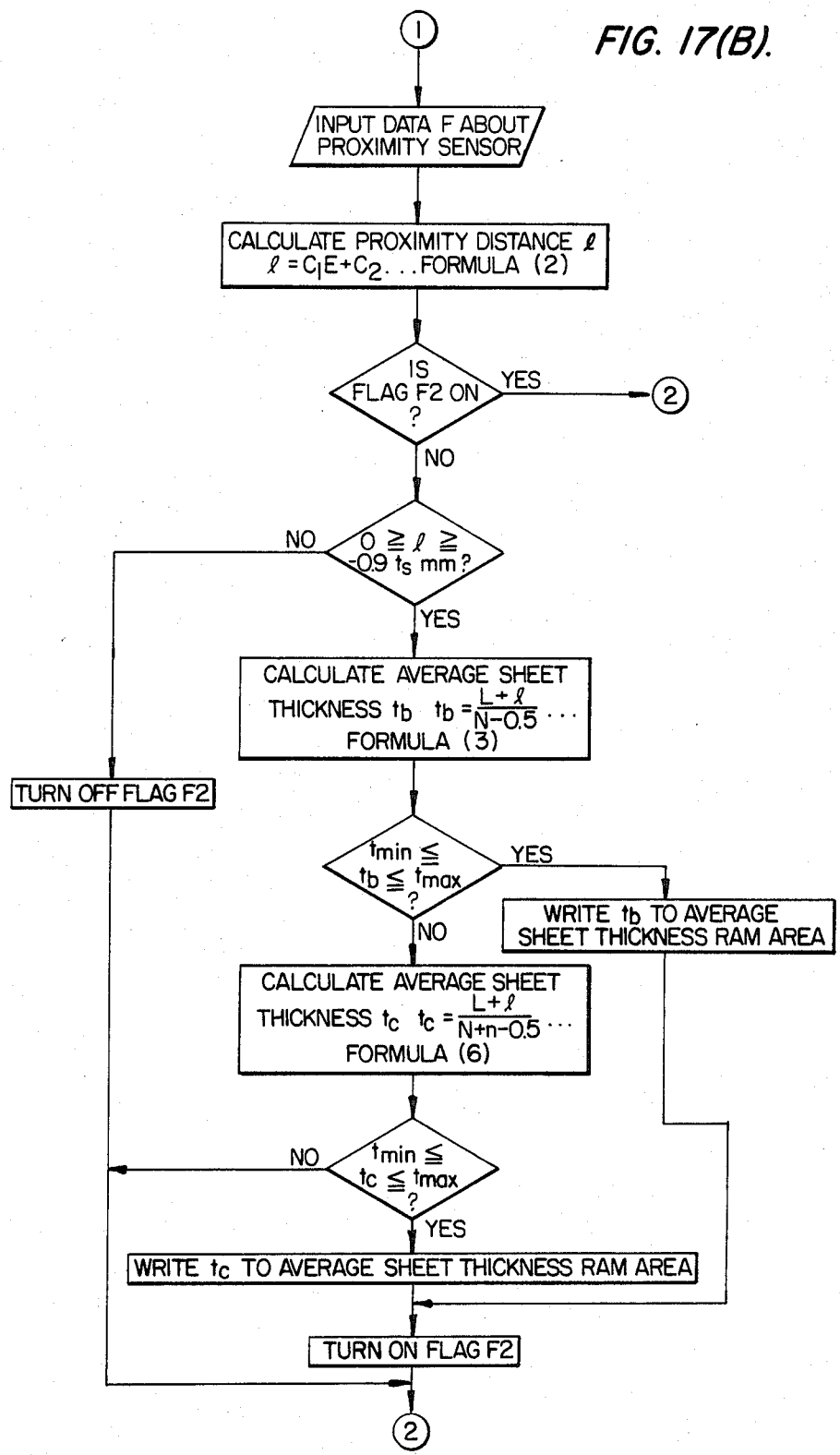

An approximate flowchart for an embodiment of a control device having a microcomputer incorporated therein is as shown in FIG. 17.

In the initial processing after the power is turned on, the contents of the RAM area for storing flag and counter data areas are cleared, whereupon according to the core sheet standard thickness data $t_2$ registered in advance, the dimensional allowance for a single core sheet is ±10%; thus, the following are calculated:

Maximum sheet thickness $t_{max}$=1.1 $t_s$ (7)

Minimum sheet thickness $t_{min}$=0.9 $t_s$ (8)

Subsequently, data for the digital switches 21 and 22 which set the product thickness and metal die proximity sensor distance is read in, and the product thickness target value T is calculated from formula (1) and, together with the metal die proximity sensor distance L, is stored in the RAM area. In the rising phase of the sheet care counting microswitch 6 (the instant when it is turned ON), the ON-OFF control of the solenoids 9 and 12 and the calculation of average sheet thickness are performed in the manner shown in FIG. 17.

Figure 13:
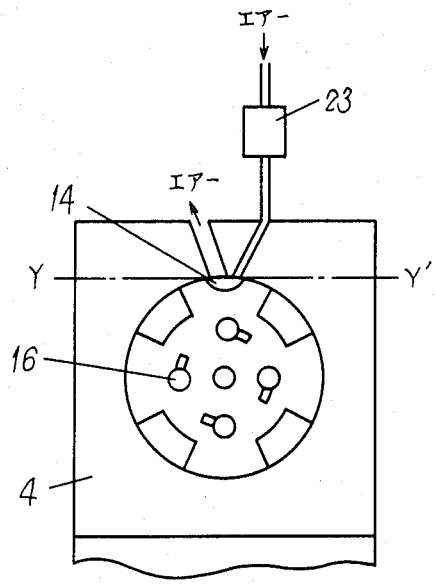
Figure 14:
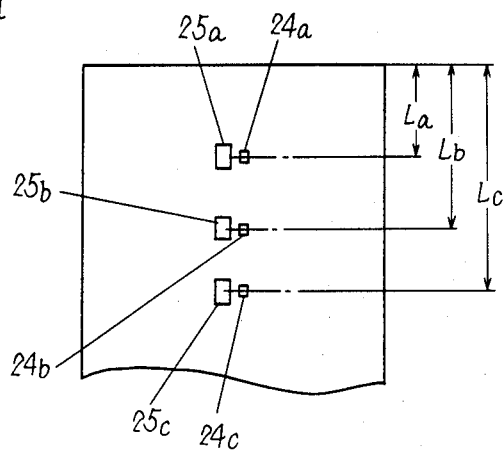
FIG. 14 is a cross section of an air pressure sensor, at a lower metal die 4, as an embodiment of the proximity sensor in the FIG. 5 embodiment.

FIG. 13 is a cross section of a portion of the lower metal die 4 adjacent the sensor, where an air pressure sensor is used in the embodiment shown in FIG. 5. FIG. 14 is a longitudinal section taken along the line Y—Y' of FIG. 13, wherein 24a, 24b and 24c denote air spout ports and 25a, 25b and 25c denote air exhaust ports. When there is a mark hole 14, air flows in the manner shown in FIG. 13 and the air back pressure drops, but when there is no mark hole, air does not flow and the air back pressure rises; thus, by measuring the air back pressure using the back pressure sensor 23, it is possible to detect the mark hole presence.

Further, the mark hole can also be detected by using an air flow sensor to directly measure the air flow rate.

Figure 15:
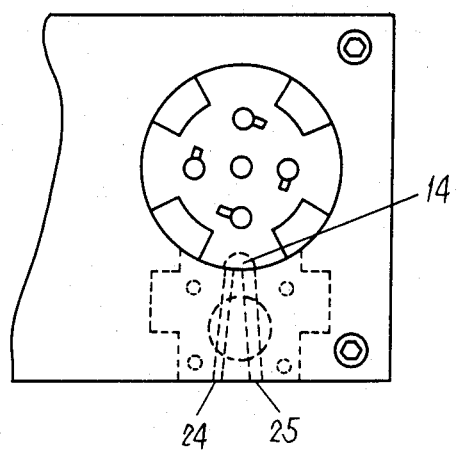
FIG. 15 is a cross section of a vertically movable air pressure sensor at a lower metal die.
Figure 16:
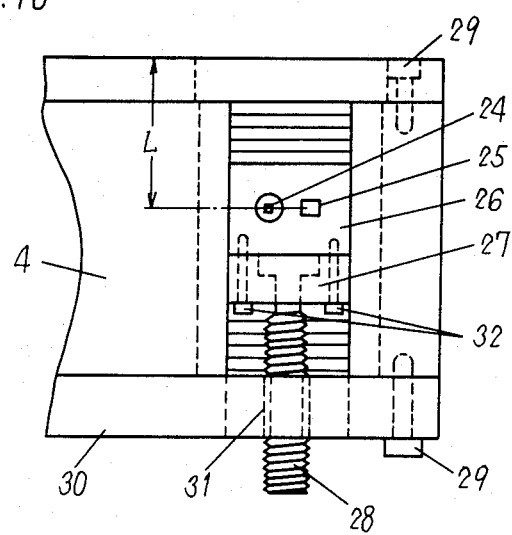
FIG. 16 is a vertical section of the same.

FIGS. 15 and 16 are top and side views of the metal die 4, showing a construction in which an air pressure sensor is used as a proximity sensor in the embodiment shown in FIG. 12.

In these figures, 24 denotes an air spout port and 25 denotes an exhaust port, and a sensor block 26 thus machined is supported by a special screw 28 whose upper end is cylindrically machined. A metal die lower block 30 attaches to the lower metal die 4 by screws 29 is formed with a threaded hole 31 for the screw 28. The numeral 27 denotes a block for preventing the screw 28 for the sensor block 26 from playing or separating, said block 27 having a hole formed therein which conforms to the cylindrical shape of the upper end of the screw 28, said block 27 being fixed to the sensor block 26 by screws 32. Thus, rotating the screw 28 vertically moves the sensor block 26, thereby making it possible to change the metal die length.

In addition, in the present invention a mark hole 14 is formed and this is detected by the sensor 15, but the apparatus may also be constructed on the same principle in the case of using a method in which paint is blown to form a mark on the portion of the core sheet which is not in direct contact with the metal die and this mark is detected by a sensor.

While the distances $L_a$, $L_b$, $L_c$, and L from the upper end surface of the lower metal die to the center of the proximity sensor must be measured with an accuracy of 0.1 mm or higher, it is easy to make measurements with such a degree of accuracy by using a slide caliper, micrometer or the like. In the description given so far, the mark hole and throughgoing hole making solenoids 9 and 12 have been considered to be separately controlled. However, as shown in FIG. 12, it is also possible to use a construction adapted to form a throughgoing hole and a mark hole at the same time by a single solenoid 21.

Both the upper and lower metal dies, when subjected to a predetermined number of times of operation, will lose their sharpness. Thus, it is necessary to grind the cutting surfaces of the metal dies after operation for a fixed period of time so as to maintain the given sharpness. Therefore, the distances $L_a$, $L_b$, $L_c$, and L from the upper end surface of the lower metal die to the center of the proximity sensor will become gradually shorter. Thus, unless these distances are measured and inputted into the control device 17 when the metal dies have been ground, a product thickness control error will be caused, but this problem can be easily solved by the operator changing the preset value in the digital switch 22.

The description given so far is based on the assumption that the first core sheet for the laminated product is to be formed with a mark hole together with a throughgoing hole. However, in a metal die so constructed that a core sheet having a mark hole is formed several sheets (M sheets) prior to a core sheet having a throughgoing hole, the average sheet thickness can also be calculated by formula (3), and the lamination thickness $S_{bA}$ of the semi-finished product when the mark hole is detected is given by $$S_{bA} = (N+1-M)t_b \qquad (7)$$

This value, however, is more or less inaccurate as compared with the construction in which the first core sheet for the product is formed with a mark hole together with a throughgoing hole.

In a particular product, it sometimes occurs that the formation of a mark hole is not allowed. In this case, a construction is employed in which a fragment of stock removed in making the product is formed with a mark hole and such fragments are laminated in the metal die and the mark on the fragment is detected by a proximity sensor. The average sheet thickness of the fragments is calculated and, assuming that the average sheet thickness of the fragments is equal to the average sheet thickness of the product, it is possible to perform the same product thickness control.

Further, in the embodiment shown in FIG. 12, if the proximity sensor 15 is attached to a place where the attaching distance L from the upper end surface of the metal die to the proximity sensor 15 is less than the product thickness preset value by an amount corresponding to the sum of the thicknesses of 2-3 core sheets, in consideration of the fact that the mark hole forming process is one step prior to the laminating process, then it is possible to make the lamination thickness range be the preset value ±0.4 mm and downward.

INDUSTRIAL APPLICABILITY

According to the invention, product thickness control with high accuracy becomes possible in many cases including one in which the sensor accuracy is 0.1 mm or thereabouts and in which there is a sudden change in the core sheet thickness. Therefore, as compared with the conventional system, maintenance for retention of the accuracy of the production apparatus is very easy and the cost of sensors is low.

On the other hand, the invention has features that the product thickness can be easily changed by the digital switch 21 and that the error does not increase even if the product thickness preset value is large.

Thus, it greately improves the accuracy of the product, contributing much to stabilizing the quality.

What is claimed is:

1. A laminated core product producing apparatus wherein a projection is formed on part of a strip of core sheet material and core sheets with said projection are punched out of the strip and assembled in a linearly moving stack into the laminated core product by making use of the mutual fitting and crimping of the projections on the core sheets, the thickness of the laminated core product in the direction of the thickness of the core sheets being determined by controlling the intermittent punching out of said projections, said apparatus comprising:
- a marking mechanism for selectively marking a portion of the lateral side edge of a core sheet to be punched out;
- at least one proximity sensor provided adjacent the stacked core sheets being assembled into the core product for producing a signal corresponding to the distance of a marked core sheet from the head of the stack during movement of the marked core sheet along the stack;
- means for generating a timing signal each time said core product producing apparatus punches out one core sheet and assembles it on the stack;
- means for presetting the target value of the thickness of the core product in the direction of the thickness of the laminations;
- memory means for storing information about the distance of said proximity sensor from the head of the stack;
- an intermittent projection punching mechanism capable of being electrically controlled for forming or not forming the projection; and
- a control device connected to said timing signal generating means, said proximity sensor, said memory means and said target value presetting means and having an output connected to said intermittent punching mechanism for, using the count of said timing signals after actuating of said marking mechanism as being the number of sheets in the assembly of core sheets, calculating the thickness of the assembly of core sheets from the information provided by the proximity sensor detecting said marked core sheet and from the information about the distance of said proximity sensor from the head of the stack and dividing by the number of sheets counted to find the average thickness of one core sheet and adding the value of such average thickness for the number of core sheets to provide a cumulative value for each said timing signal and providing an output signal for controlling the operation of said punching mechanism when said cumulative value excceds said target value.

2. An apparatus as claimed in claim 1 wherein there are a plurality of proximity sensors at a plurality of positions adjacent the stack, and switching means for connecting a desired one of said sensor to said control device.

3. An apparatus as claimed in claim 1 wherein said proximity sensor is movable among a plurality of positions along said stack.

4. An apparatus as claimed in claim 1 wherein said marking mechanism comprises means for punching a hole in the strip along the circumference of the core sheet to be punched out of the strip, whereby a notch is formed in the edge of the core sheet when it is punched out, and said proximity sensor comprises an air spout port directed toward the stack at the position where the notch will pass said proximity detector toward an air exhaust port extending away from the position, and means for directing a flow of air through said air spout port toward the stack and means for detect the rate of flow of air through said air spout port.

* * * * *